(12) United States Patent
Ahn et al.

(10) Patent No.: US 9,357,420 B2
(45) Date of Patent: May 31, 2016

(54) METHOD AND APPARATUS FOR REPORTING CHANNEL STATE

(75) Inventors: Joon Kui Ahn, Anyang-si (KR); Dong Youn Seo, Anyang-si (KR); Suck Chel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 14/131,151

(22) PCT Filed: Jul. 13, 2012

(86) PCT No.: PCT/KR2012/005576
§ 371 (c)(1),
(2), (4) Date: Jan. 6, 2014

(87) PCT Pub. No.: WO2013/012212
PCT Pub. Date: Jan. 24, 2013

(65) Prior Publication Data
US 2014/0126409 A1 May 8, 2014

Related U.S. Application Data

(60) Provisional application No. 61/508,072, filed on Jul. 15, 2011.

(51) Int. Cl.
*H04W 24/10* (2009.01)
*H04L 5/00* (2006.01)

(52) U.S. Cl.
CPC .............. *H04W 24/10* (2013.01); *H04L 5/0007* (2013.01); *H04L 5/0057* (2013.01)

(58) Field of Classification Search
None
See application file for complete search history.

(56) References Cited

U.S. PATENT DOCUMENTS

| 2009/0316662 | A1 | 12/2009 | Yagihashi | |
|---|---|---|---|---|
| 2010/0173659 | A1* | 7/2010 | Shin et al. | 455/500 |
| 2011/0124357 | A1 | 5/2011 | Kim et al. | |
| 2011/0216682 | A1* | 9/2011 | Xu et al. | 370/311 |
| 2012/0269153 | A1 | 10/2012 | Seo et al. | |
| 2014/0126409 | A1* | 5/2014 | Ahn et al. | 370/252 |

FOREIGN PATENT DOCUMENTS

| KR | 10-2011-0058642 A | 6/2011 |
|---|---|---|
| WO | 2011/074885 A2 | 6/2011 |
| WO | 2011/085230 A2 | 7/2011 |

* cited by examiner

*Primary Examiner* — Benjamin H Elliott, IV
(74) *Attorney, Agent, or Firm* — Birch, Stewart, Kolasch & Birch, LLP

(57) ABSTRACT

A method and an apparatus for reporting a channel state in a wireless communication system are provided. A wireless device monitors a physical downlink control channel (PDCCH) for downlink control information (DCI), which comprises a request for a channel quality indicator (CQI) for a plurality of wireless devices. When a CQI report is triggered by the request for the CQI, the wireless device reports the CQI to a base station.

14 Claims, 7 Drawing Sheets

(A)

(B)

FIG. 6
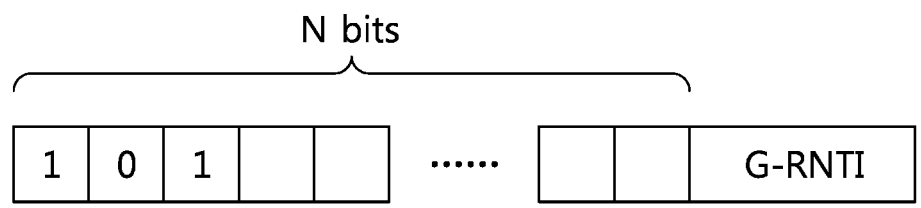
(A)
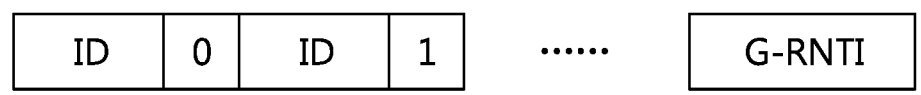
(B)

METHOD AND APPARATUS FOR REPORTING CHANNEL STATE

This application is the National Phase of PCT/KR2012/005576 filed on Jul. 13, 2012, which claims priority under 35 U.S.C. 119(e) to U.S. Provisional Application No. 61/508,072 filed on Jul. 15, 2011, all of which are hereby expressly incorporated by reference into the present application.

BACKGROUND OF THE INVENTION

1. Field of the invention

The present invention relates to wireless communications, and more particularly, to a method and apparatus for reporting a channel state in a wireless communication system.

2. Related Art

Long term evolution (LTE) based on 3rd generation partnership project (3GPP) technical specification (TS) release 8 is a promising next-generation mobile communication standard. Recently, LTA-A (LTE-advanced) based on 3GPP TS release 10 supporting multiple carriers is under standardization.

In a next-generation wireless communication system, it is considered to provide a service for a low cost/low specification device which primarily aims at data communication, such as reading a meter, measuring a water level, utilizing a camera, inventory reporting of a vending machine, etc.

For example, machine-type communication (MTC) is one type of data communication including one or more entities not requiring human interactions, and is also called machine to machine (M2M) communication. That is, the MTC refers to the concept of communication based on the legacy wireless communication network used by a mechanical device instead of a user equipment (UE) used by a user. The mechanical device used in the MTC is called an MTC device or an M2M device.

Although an amount of traffic transmitted at a time is small in the MTC device, the number of MTC devices operating simultaneously may be great. Accordingly, a signaling overhead may be significantly increased when dynamic scheduling and control information exchange are achieved for each MTC device.

SUMMARY OF THE INVENTION

The present invention provides a method and apparatus for reporting a channel state.

According to one aspect of the present invention, a method of reporting a channel state in a wireless communication system is provided. The method includes monitoring by a wireless device a physical downlink control channel (PDCCH) for downlink control information (DCI) including a channel quality indicator (CQI) request for a plurality of wireless devices; and reporting by the wireless device a CQI to a base station when a CQI report is triggered by the CQI request.

In the aforementioned aspect of the present invention, a group-radio network temporary identifier (G-RNTI) may be masked to a cyclic redundancy check (CRC) of the DCI.

According to another aspect of the present invention, a wireless device for reporting a channel state in a wireless communication system is provided. The wireless device includes: a radio frequency (RF) unit for transmitting and receiving a radio signal; and a processor operatively coupled to the RF unit, wherein the processor is configured for: monitoring a PDCCH for DCI including a CQI request for a plurality of wireless devices; and reporting a CQI to a base station when a CQI report is triggered by the CQI request.

According to another aspect of the present invention, a base station for receiving a channel state in a wireless communication system is provided. The base station includes: an RF unit for transmitting and receiving a radio signal; and a processor operatively coupled to the RF unit, wherein the processor is configured for: transmitting a PDCCH for DCI including a CQI request for a plurality of wireless devices; and receiving a CQI from each of the plurality of wireless devices.

A signaling overhead caused by a frequent channel quality indicator (CQI) request can be decreased. An overhead caused by blind decoding of a physical downlink control channel (PDCCH) can be decreased, and battery consumption of a wireless device can be decreased.

BRIEF DESCRIPTION OF THE DRAWINGS

FIG. 6 shows examples for a group CQI request.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-A based on 3GPP TS release 10. However, this is for exemplary purposes only, and thus the present invention is also applicable to various wireless communication networks.

A wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) messages).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
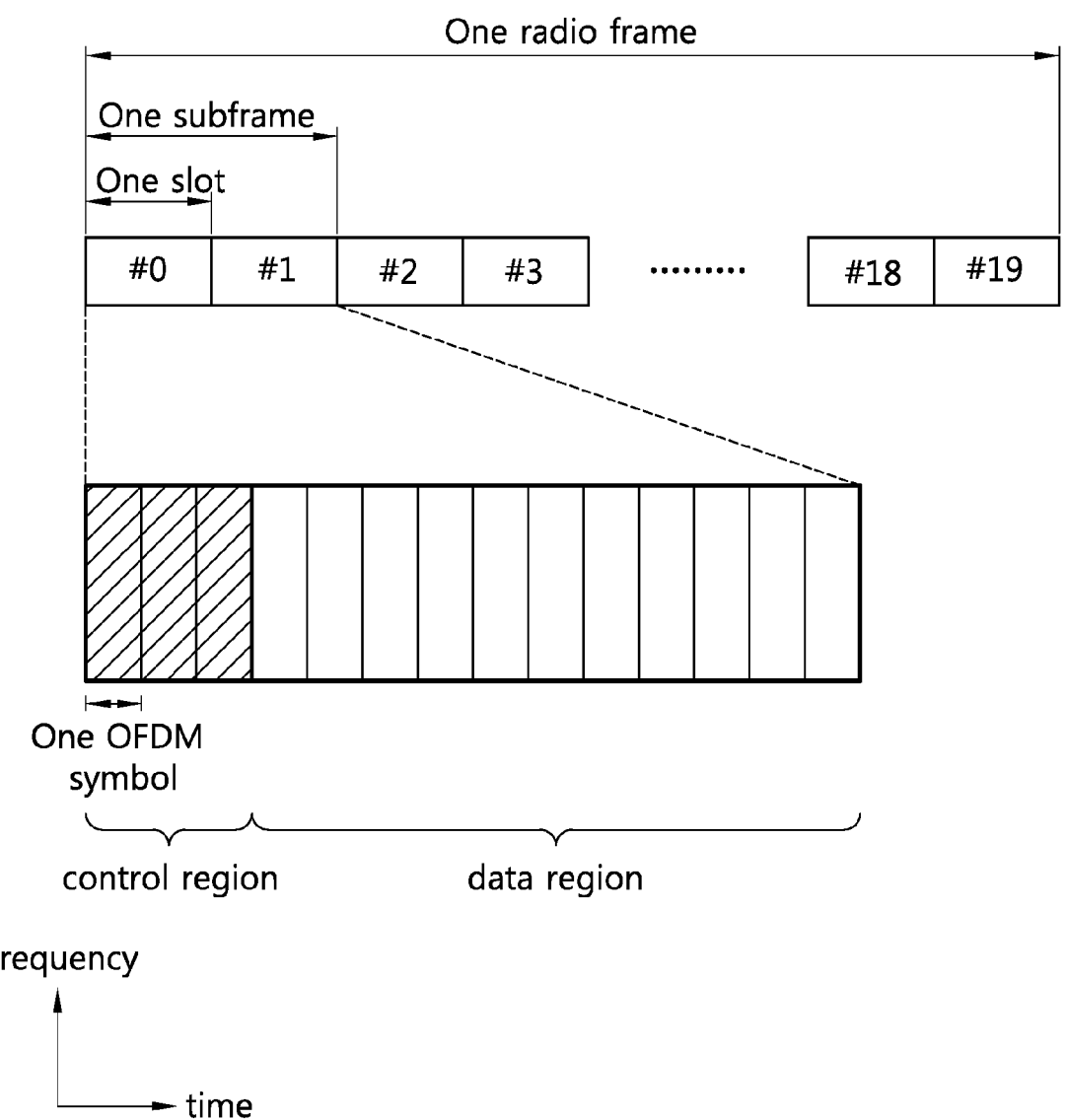
FIG. 1 shows a structure of a downlink radio frame in 3rd generation partnership project (3GPP) long term evolution (LTE).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As described in 3GPP TS 36.211 V10.2.0, in 3GPP LTE/LTE-A, a physical channel can be divided into a data channel (e.g., a physical downlink shared channel (PDSCH) and a physical uplink shared channel (PUSCH)) and a control channel (e.g., a physical downlink control channel (PDCCH), a physical control format indicator channel (PCFICH), a physical hybrid-ARQ indicator channel (PHICH), and a physical uplink control channel (PUCCH)).

The PCFICH transmitted in a first OFDM symbol of the subframe carries a control format indicator (CFI) regarding the number of OFDM symbols (i.e., a size of the control region) used for transmission of control channels in the subframe. The wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
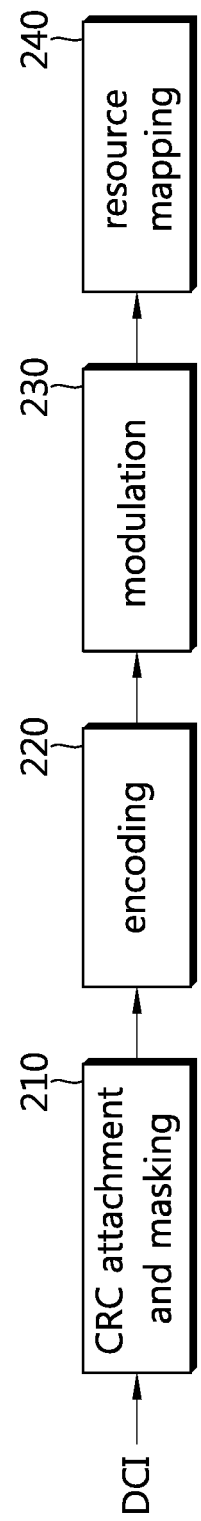
FIG. 2 shows a structure of a physical downlink control channel (PDCCH).

FIG. 2 shows a structure of a PDCCH. A BS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH (step 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (step 220). Encoding includes channel encoding and rate matching.

The coded data is modulated to generate modulation symbols (step 230).

The modulation symbols are mapped to physical resource elements (REs) (step 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
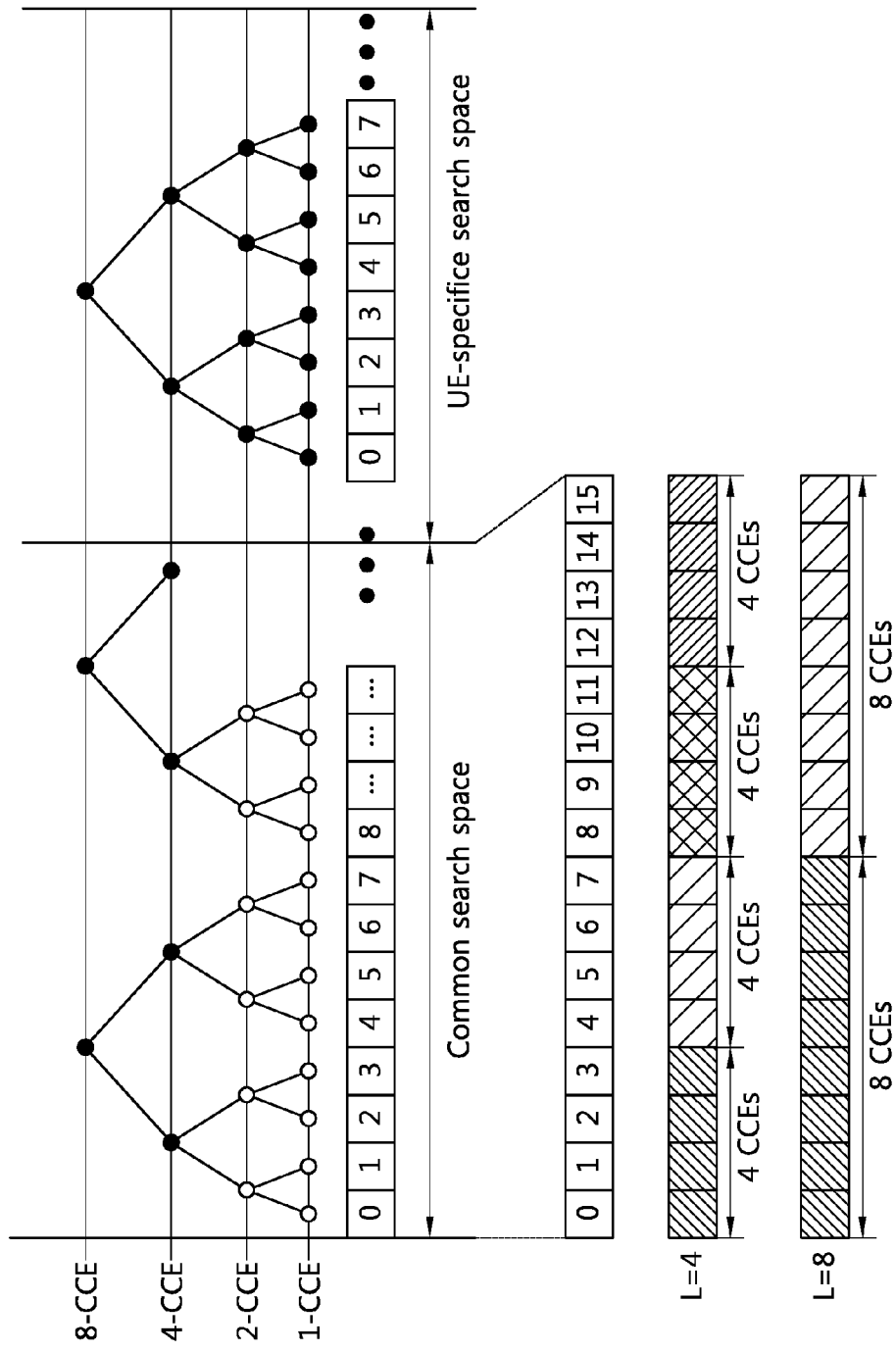
FIG. 3 shows an example of monitoring a PDCCH.

FIG. 3 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1, 2, 3, 4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \qquad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the UE, m′=m+$M^{(L)}$$n_{cif}$. Herein, $n_{cif}$ is a value of the CIF. If the CIF is not set to the UE, m′=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \qquad \text{[Equation 2]}$$

Herein, $Y_{-1}$=$n_{RNTI}$≠0, A=39827, D=65537, k=floor($n_s$/2), and $n_s$ denotes a slot number in a radio frame.

Now, a channel state report in 3GPP LTE will be described.

Figure 4:
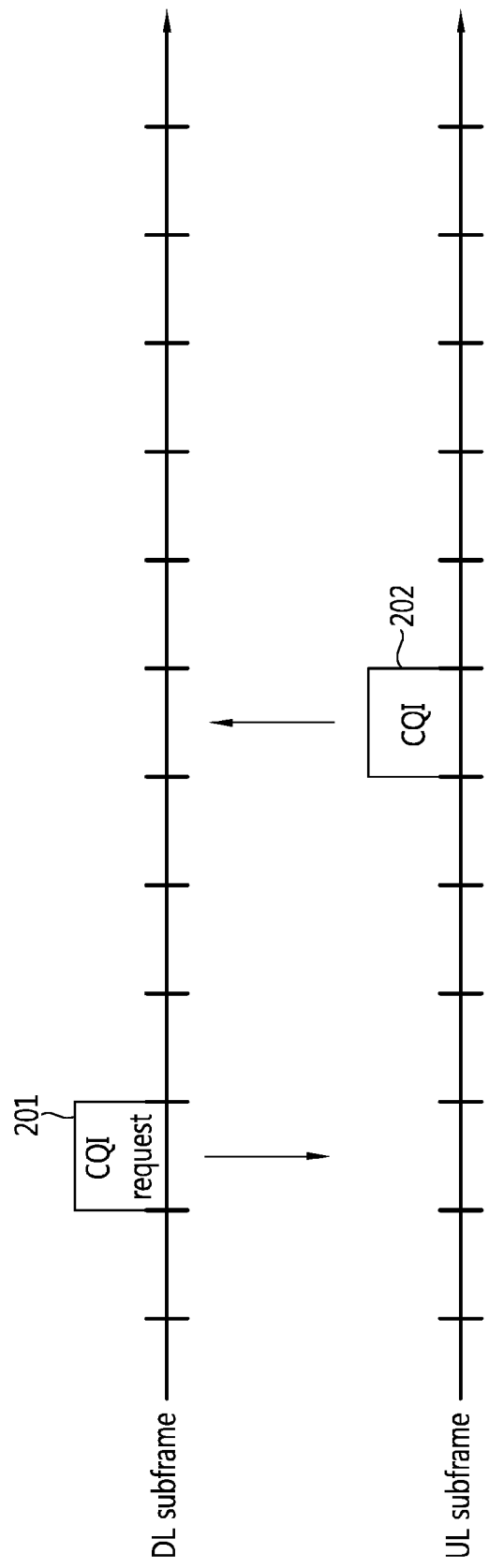
FIG. 4 shows channel quality indicator (CQI) reporting in the conventional 3GPP LTE.

FIG. 4 shows CQI reporting in the conventional 3GPP LTE.

A BS transmits a CQI request 201 through a PDCCH in a DL subframe. The CQI request 201 is included in a DCI format 0 or a random access response. The DCI format 0 is used for transmission of a UL grant. The UL grant further includes a UL resource allocation for a PUSCH.

The CQI request 201 indicates whether CQI reporting is triggered by using a 1-bit field. For example, if a value of the CQI request 201 is set to '1', it means that the BS requests a UE (or a wireless device) to perform CQI reporting.

If the CQI request 201 indicates the triggering of the CQI reporting, the wireless device transmits a CQI 202 to the BS through a PUSCH.

Since the wireless device reports the CQI at the request of the BS, this is called aperiodic CQI reporting.

In 3GPP LTE, there are three types of CQI feedback, that is, Wideband, UE selected, and Higher layer-configured. In addition, there are also three types of PMI feedback, that is, No PMI, Single PMI, and Multiple PMI. According to the CQI feedback type and the PMI feedback type, a transmission mode is divided as shown in Table 2 below.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

TABLE 2

|  | No PMI | Single PMI | Multiple PMI |
|---|---|---|---|
| Wideband (wideband CQI) |  |  | Mode 1-2 |
| UE selected (subband CQI) | Mode 2-0 |  | Mode 2-2 |
| Higher layer-configured (subband CQI) | Mode 3-0 | Mode 3-1 |  |

According to the mode 1-2, a PMI is selected under the assumption that data is transmitted in each subband. The wireless device determines a CQI by assuming the selected PMI with respect to a system band or a whole band designated by a higher layer (such a band is called a set S). The wireless device transmits the CQI and the PMI of each subband. Since the CQI of a whole band or subbands included in the set S is transmitted, it is called a wideband CQI. A size of each subband may vary depending on a size of the system band.

According to the mode 2-0, the wireless device selects M (M>0) preferred subbands in the system band or the set S. The wireless device determines a CQI for the selected M subbands (such a subband is called a subband CQI). In addition, the wireless device additionally determines a wideband CQI with respect to the system band or the set S. The wireless device transmits the selected M subbands, one CQI for the selected M subbands, and the wideband CQI.

According to the mode 2-2, M preferred subbands and a single PMI for the M preferred subbands are determined. In addition, the wireless device determines a wideband CQI with respect to the system band or the set S. The wireless device transmits the selected M subbands, one CQI for the selected M subbands, a single PMI for the M selected subbands, and a wideband CQI.

According to the mode 3-0, the wireless device determines the wideband CQI. Further, the wireless device determines a CQI for each subband.

According to the mode 3-1, the UE determines a single PMI with respect to the system band or the set S. The UE determines a wideband CQI and a subband CQI for each subband by assuming the single PMI.

Now, the proposed channel state report will be described.

Hereinafter, a CQI is also referred to as channel state information (CSI), and implies various indicators for representing a channel state. The CQI may include information indicating at least any one of a modulation and coding scheme (MCS), a rank indicator (RI), a signal-to-noise ratio (SNR), and a precoding matrix indicator (PMI). Unless otherwise specified, the CQI may include at least any one of a subband CQI and a wideband CQI.

As described above, an MTC service characteristically has a small traffic amount and is sensitive to battery efficiency. In order for a BS to obtain a DL channel state for many MTC devices, if a CQI request is transmitted for each device as in the conventional method, the number of required PDCCHs is increased, and a device overhead caused by PDCCH monitoring is also increased.

Figure 5:
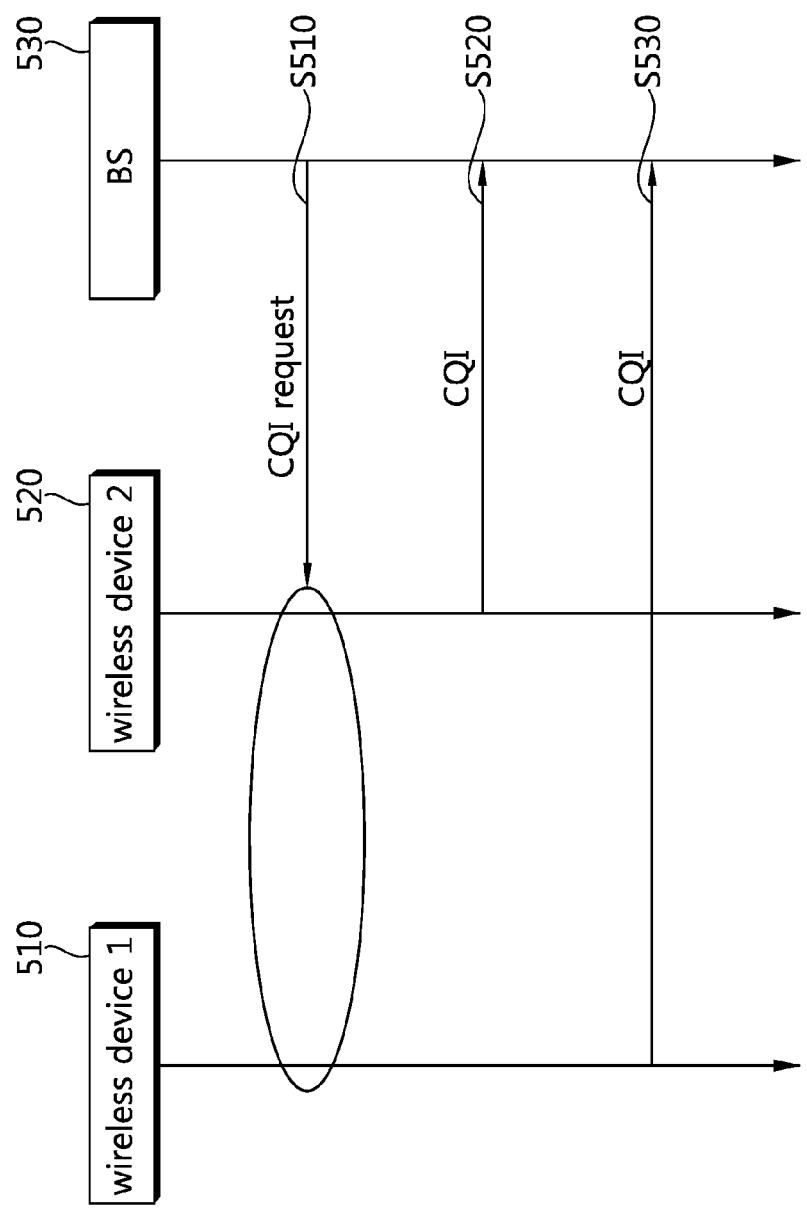
FIG. 5 is a flowchart showing a method of reporting a channel state according to an embodiment of the present invention.

FIG. 5 is a flowchart showing a method of reporting a channel state according to an embodiment of the present invention.

Although two wireless devices 510 and 520 are described herein for example, the number of wireless devices is not limited thereto. A group identifier belonging to an MTC group may be allocated to each wireless device. The wireless device #1 510 and the wireless device #2 520 may belong to the same MTC group.

In step S510, a BS 530 transmits to the plurality of wireless devices 510 and 520 a CQI request for triggering a CQI report. Since the CQI request triggers the CQI report for the plurality of wireless devices 510 and 520, it can also be called a group CQI request.

In steps S520 and S530, the wireless device #1 510 and the wireless device #2 520 report respective CQIs to the BS 530 according to the CQI request.

If there is an allocated PUSCH resource, the wireless devices 510 and 520 may transmit a CQI on a PUSCH. The BS 530 may report whether to send the CQI on the PUSCH, when the PUSCH resource is allocated. Alternatively, the PUSCH resource for CQI transmission may be pre-allocated to each wireless device.

The wireless device #1 510 and the wireless device #2 520 may simultaneously transmit the CQIs on the PUCCH (e.g., through the same UL subframe). A different PUCCH resource may be pre-allocated to each of the wireless device #1 510 and the wireless device #2 520.

A CQI request using the existing UL grant may overlap with a group CQI request when the CQI report is triggered. The wireless devices 510 and 520 may prioritize the CQI request using the UL grant over the group CQI request. PUSCH transmission scheduled through the UL grant may be prioritized over the group CQI request irrespective of whether the CQI request is included, so that only a scheduled PUSCH is transmitted without transmission of the group CQI.

FIG. 6 shows examples for a group CQI request. In the example, transmission is achieved in a DCI format in which the group CQI request is transmitted on a PDCCH.

A group-RNTI (G-RNTI) is an identifier indicating a DCI format for the group CQI request. A wireless device may monitor a PDCCH on the basis of the G-RNTI. The G-RNTI may be defined as an additional identifier irrespective of an MTC group, or may be defined for each MTC group.

In FIG. 6(A), DCI consists of N bits, and each bit indicates a CQI request of one wireless device. For example, if a corresponding bit is set to '1', a CQI report is triggered, and if it is set to '0', the CQI report is not triggered.

For the group CQI report, a UL resource (e.g., a PUSCH resource or a PUCCH resource) may be allocated in advance to each wireless device. The wireless device reads a CSI request bit allocated to itself within the DCI on a PDCCH identified by the G-RNTI, and performs the CQI report. Which bit of the DCI will be referred by each wireless device may be reported in advance by a BS.

Although it is described herein that the CQI request is 1 bit for example, the CQI request may be n bits (where n>1). If the CQI request is n bits, a variety of additional information for the CQI report such as the CQI report mode of Table 2 may be reported by the BS to the wireless device.

FIG. 6(B) shows an example in which an identifier of a wireless device in which the CQI report is triggered is included in DCI. 'ID' may be an identifier of each wireless device or an identifier of an MTC group.

Figure 7:
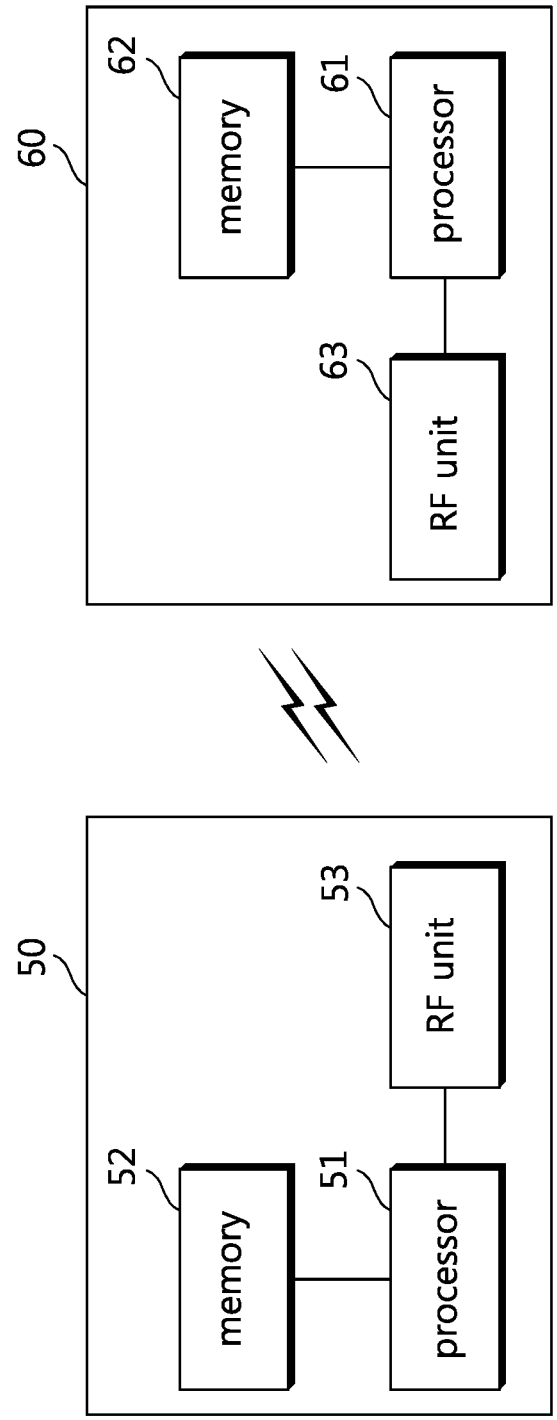
FIG. 7 is a block diagram of a wireless communication system according to an embodiment of the present invention.

FIG. 7 is a block diagram of a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of reporting a channel state in a wireless communication system, the method comprising:
    monitoring, by a user equipment (UE), a physical downlink control channel (PDCCH) for first downlink control information (DCI) including a request for a transmission of a first type channel quality indicator (CQI), wherein the first DCI is masked with a first network temporary identifier (RNTI) associated with a UE group;
    determining whether a request for a transmission of a second type CQI is received at the UE, wherein the second type CQI is included in second DCI being masked with a second RNTI assigned to the UE; and
    if the transmission of the first type CQI and the transmission of the second type CQI from the UE are requested, reporting, by the UE, only the second type CQI to a base station.

2. The method of claim 1, wherein a plurality of UEs associated with a machine type communication (MTC) belong to the UE group.

3. The method of claim 1, wherein the first DCI includes a plurality of CQI request bits, and the plurality of CQI request bits respectively correspond to a plurality of UEs, wherein the plurality of UEs belong to the UE group.

4. The method of claim 3, wherein each of the plurality of CQI request bits is 1 bit.

5. The method of claim 1, wherein the first DCI includes a CQI request bit corresponding to an identifier of a corresponding UE in which the transmission of the first type CQI is requested.

6. The method of claim 1, wherein the first DCI includes a CQI request bit corresponding to an identifier of the UE group.

7. The method of claim 1, wherein the second type CQI is reported if the request for the transmission of the first type CQI and the first type CQI is received in a same subframe.

8. A user equipment (UE) for reporting a channel state in a wireless communication system, the UE comprising:
    a radio frequency (RF) unit configured to transmit and receive a signal; and
    a processor coupled to the RF unit and configured to:
        monitor a physical downlink control channel (PDCCH) for first downlink control information (DCI) including a request for a transmission of a first type channel quality indicator (CQI), wherein the first DCI is masked with a first network temporary identifier (RNTI) associated with a UE group,
        determine whether a request for a transmission of a second type CQI is received at the UE, wherein the second type CQI is included in second DCI being masked with a second RNTI assigned to the UE, and
        if the transmission of the first type CQI and the transmission of the second type CQI from the UE are requested, report only the second type CQI to a base station.

9. The UE of claim 8, wherein a plurality of UEs associated with machine type communication (MTC) belong to the UE group.

10. The UE of claim 8, wherein the first DCI includes a plurality of CQI request bits, and the plurality of CQI request bits respectively correspond to a plurality of UEs, wherein the plurality of UEs belong to the UE group.

11. The UE of claim 10, wherein each of the plurality of CQI request bits is 1 bit.

12. The UE of claim 8, wherein the first DCI includes a CQI request bit corresponding to an identifier of a corresponding UE in which the transmission of the first type CQI is requested.

13. The UE of claim 8, wherein the first DCI includes a CQI request bit corresponding to an identifier of the UE group.

14. The UE of claim 8, wherein the second type CQI is reported if the request for the transmission of the first type CQI and the first type CQI is received in a same subframe.

* * * * *